Patented Dec. 6, 1932

1,889,934

UNITED STATES PATENT OFFICE

RALPH S. RICHARDSON, OF TEANECK, NEW JERSEY

PURIFICATION OF NITROGEN-HYDROGEN MIXTURES FOR AMMONIA SYNTHESIS

No Drawing.    Application filed August 16, 1929. Serial No. 386,500.

My invention relates to the preparation of nitrogen-hydrogen mixtures for the synthesis of ammonia, and more particularly to improved methods of purifying the gas-mixture of the impurities which would poison or otherwise render ineffective the catalysts used in the catalytic production of ammonia.

The method of producing a nitrogen-hydrogen mixture suitable for ammonia synthesis from coke oven gas or similar gases containing hydrogen and such impurities as oxygen, carbon dioxide, methane and higher hydrocarbons, by counter-current scrubbing with liquid nitrogen is well known and is a standard method used extensively in ammonia synthesis.

While this method removes practically all of the methane and impurities injurious to the catalyst, yet there always remains sufficient trace of carbon monoxide to lower the activity of the ammonia catalyst, and there remains the possibility that through faulty operation the quantity of carbon monoxide may increase sufficiently to poison completely the ammonia catalyst.

Moreover, the process of washing with nitrogen which usually contains traces of oxygen, introduces into the gas mixture small quantities of oxygen which affects adversely the catalyst activity, oxygen being considered to have double the noxious effect on the ammonia catalyst compared to carbon monoxide.

The object of my invention is, among other things, to introduce a novel and economical purification step in the process of preparing the nitrogen-hydrogen mixture suitable for the synthesis of ammonia after such mixture has been partially purified and prepared by washing with liquid nitrogen.

I have discovered that the traces of oxygen and carbon monoxide in the gas mixture after the nitrogen washing can be so completely removed that their effect on the ammonia catalyst is negligible by subjecting the gas mixture proceeding from the nitrogen washing to a catalytic purification whereby the carbon monoxide reacts with hydrogen to form water and methane and the oxygen reacts with hydrogen to form water, according to the following equations:

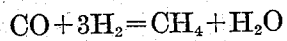
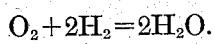

The gas mixture coming from the nitrogen washing is brought at high temperature into contact with a catalyst whereby the oxygen in the gas mixture is reduced. Any of the known methods of catalytic reduction may be used, and the catalysts employed may be nickel, copper, or mixtures of the same, which are capable of converting the oxygen in the gases to water vapor which may be readily removed from the system in subsequent treatment by known methods before the purified gas mixture is brought to the ammonia catalyst.

It would seem to be uneconomical to purify further the already comparatively pure gas mixture leaving the nitrogen washing, inasmuch as it would involve additional apparatus, and would produce a greater quantity of the impurities methane and water vapor in the gas stream, and also would consume considerable quantities of hydrogen compared to the quantity of oxygen-containing gases that were removed; but practically, I have found that the advantages far outweigh the disadvantages. Of the gases resulting from this purification, methane is not a catalyst poison and lowers the activity of the catalyst only by its influence as an inert gas, and water, while it is a catalyst poison, can be readily removed by various known methods. The loss of hydrogen is sufficiently compensated by the increased activity and life of the catalyst so that the net result over a period of operation is a lower consumption of hydrogen per unit of ammonia than if the gases were not so purified.

Furthermore, I have discovered that the process of catalytic purification can be carried out efficiently at comparatively lower pressures such as are used in the nitrogen washing and in fact can follow directly the nitrogen washing. This results in a considerable simplification of apparatus compared to what would be required if the purification were effected at the higher pressure of the ammonia synthesis.

I claim as my invention:—

1. In the purification of nitrogen-hydrogen mixtures for ammonia synthesis, the steps which comprise washing the gas mixture with liquid nitrogen under pressure, converting the oxygen in the washed gases to water vapor with the aid of a catalyst, maintaining substantially the same pressure on the gases during the washing and catalytic conversion steps, removing the water vapor from the gases, passing the gases to an ammonia synthesis such synthesis being conducted at a pressure greater than that of the washing step.

2. In the purification of nitrogen-hydrogen mixtures for ammonia synthesis, the steps which comprise washing the gas mixture with liquid nitrogen under pressure, converting the free and combined oxygen in the washed gases to water vapor with the aid of a catalyst, maintaining substantially the same pressure on the gases during the washing and catalytic conversion steps, removing the water vapor from the gases and passing the gases to an ammonia synthesis, such synthesis being conducted at a pressure greater than that of the washing step.

3. In the purification of nitrogen-hydrogen mixtures for ammonia synthesis, the steps which comprise washing the gas mixture with liquid nitrogen under pressure, converting the oxygen in the washed gases to water vapor and the carbon monoxide to water vapor and methane with the aid of a catalyst, maintaining substantially the same pressure on the gases during the washing and catalytic conversion steps, removing the water vapor from the gases, passing the gases to an ammonia synthesis, and conducting the ammonia synthesis under a pressure greater than that of the washing step.

RALPH S. RICHARDSON.